(12) United States Patent
Ahn et al.

(10) Patent No.: US 9,432,813 B2
(45) Date of Patent: Aug. 30, 2016

(54) METHOD AND APPARATUS FOR CALCULATING LOCATION OF TERMINAL IN WIRELESS COMMUNICATION SYSTEM

(71) Applicant: LG Electronics Inc., Seoul (KR)

(72) Inventors: Hongbeom Ahn, Anyang-si (KR); Jaehyuk Choi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/424,821

(22) PCT Filed: Sep. 13, 2013

(86) PCT No.: PCT/KR2013/008297
§ 371 (c)(1),
(2) Date: Feb. 27, 2015

(87) PCT Pub. No.: WO2014/042457
PCT Pub. Date: Mar. 20, 2014

(65) Prior Publication Data
US 2015/0223027 A1 Aug. 6, 2015

Related U.S. Application Data

(60) Provisional application No. 61/700,348, filed on Sep. 13, 2012, provisional application No. 61/763,975, filed on Feb. 13, 2013, provisional application No. 61/823,912, filed on May 16, 2013, provisional application No. 61/828,687, filed on May 30, 2013.

(51) Int. Cl.
*H04W 4/02* (2009.01)
*G01S 5/10* (2006.01)
*G01S 5/02* (2010.01)

(52) U.S. Cl.
CPC ............ *H04W 4/027* (2013.01); *G01S 5/0236* (2013.01); *G01S 5/0252* (2013.01)

(58) Field of Classification Search
CPC ...... G01S 5/0236; G01S 5/10; G01S 5/0252; H04W 4/027
See application file for complete search history.

(56) References Cited

U.S. PATENT DOCUMENTS 7,215,967 B1  5/2007  Kransmo et al.
2012/0094683 A1*  4/2012  Yoeli ..................... G01S 5/0027
                                                    455/456.1

(Continued)

FOREIGN PATENT DOCUMENTS

CN  1570666 A  1/2005
CN  1918921 A  2/2007

(Continued)

OTHER PUBLICATIONS

International Search Report from PCT/KR2013/008297 dated Dec. 19, 2013.

(Continued)

*Primary Examiner* — Kashif Siddiqui
(74) *Attorney, Agent, or Firm* — Dentons US LLP

(57) ABSTRACT

According to one embodiment of the present invention, a method for calculating the location of a terminal in a wireless communication system, which is to be performed by the terminal, comprises the steps of: transmitting, to a location server, a request for location estimation assist data for calculating the location of the terminal; receiving the location estimation assist data from the location server; and calculating the location of the terminal using the location estimation assist data. The location estimation assist data includes radio map information including a received signal strength (RSS) value from each access point collected at a plurality of location estimation reference points in a region having a predetermined range. The radio map includes information regarding the location estimation reference points (hereinafter, referred to as "update points") which require an update of the radio map. The method may further include a step of determining whether or not an update of the location estimation assist data is required based on the calculated location of the terminal and the information regarding the update points.

13 Claims, 8 Drawing Sheets

(56) References Cited

U.S. PATENT DOCUMENTS

2012/0149415 A1    6/2012  Valaee et al.
2013/0115956 A1*   5/2013  Ewert ................... H04W 48/08
                                                      455/437
2013/0190006 A1*   7/2013  Kazmi ................ H04W 64/006
                                                      455/456.1

FOREIGN PATENT DOCUMENTS

| CN | 1975456 A | 6/2007 |
| CN | 102474842 A | 5/2012 |
| JP | 2006029914 | 2/2006 |
| KR | 1020050028436 | 3/2005 |
| KR | 1020110026229 | 3/2011 |
| KR | 1020110094565 | 8/2011 |
| WO | 2012141808 A1 | 10/2012 |

OTHER PUBLICATIONS

Written Opinion of the ISA from PCT/KR2013/008297 dated Dec. 19, 2013.

\* cited by examiner (a)

| radioMap Reference PointIndex | radioMap Reference Points | AP₁ (AP-ID) (rssValueOfAP-1) | | AP₂ (AP-ID) (rssValueOfAP-2) | | AP₃ (AP-ID) (rssValueOfAP-3) | | ... | | AP₁₂₈ (AP-ID) (rssValueOfAP-128) | |
|---|---|---|---|---|---|---|---|---|---|---|---|
| | | Mean | Std | Mean | Std | Mean | Std | Mean | Std | Mean | Std |
| 1 | (x₁,y₁) | -73 | 1.3 | -34 | 6.1 | -33 | 9.1 | ... | ... | ... | ... |
| 2 | (x₂,y₂) | -42 | 4.2 | -23 | 7.3 | - | - | ... | ... | ... | ... |
| 3 | (x₃,y₃) | -14 | 10.3 | - | - | -52 | 1.0 | ... | ... | ... | ... |
| 4 | (x₄,y₄) | -12 | 5.2 | - | - | - | - | ... | ... | ... | ... |
| 5 | ... | ... | ... | ... | ... | ... | ... | ... | ... | ... | ... |
| 6 | ... | ... | ... | ... | ... | ... | ... | ... | ... | ... | ... |
| 7 | ... | ... | ... | ... | ... | ... | ... | ... | ... | ... | ... |
| 8 | ... | ... | ... | ... | ... | ... | ... | ... | ... | ... | ... |
| 9 | ... | ... | ... | ... | ... | ... | ... | ... | ... | ... | ... |
| 10 | ... | ... | ... | ... | ... | ... | ... | ... | ... | ... | ... |
| ... | ... | ... | ... | ... | ... | ... | ... | ... | ... | ... | ... |
| 1024 | | | | | | | | | | | | radioMap SEQUENCE (SIZE (1..1024))
rssValueOfAP SEQUENCE (SIZE (1..128))

US 9,432,813 B2

METHOD AND APPARATUS FOR CALCULATING LOCATION OF TERMINAL IN WIRELESS COMMUNICATION SYSTEM

This application is a 35 USC §371 National Stage entry of International Application No. PCT/KR2013/008297 filed on Sep. 13, 2013, and claims priority to U.S. Provisional Application Nos. 61/700,348 filed on Sep. 13, 2012; 61/763,975 filed on Feb. 13, 2013; 61/823,912 filed on May 16, 2013 and 61/828,687 filed on May 30, 2013, all of which are hereby incorporated by reference in their entireties as if fully set forth herein.

TECHNICAL FIELD

The present invention relates to a method for calculating the location of a user equipment in a wireless communication system and an apparatus therefor.

BACKGROUND ART

Generally, in fingerprint based positioning technology, the size of a fingerprint database (DB) collected for positioning calculation is large and complexity of calculation is increased. A user equipment (UE) transmits information regarding measurement (e.g. received signal strength (RSS) or an approximate location thereof) to a location server, and the location server performs complicated calculation through a fingerprint DB stored therein instead of the UE and transmits a result of performing positioning of the UE to the UE. However, due to low positioning latency, which is a requirement of a recent location based service (LBS) application, and issues of privacy and security, a method in which the UE stores the fingerprint DB and performs positioning through the fingerprint DB has been studied and developed.

However, in order to perform such a method, it is necessary to appropriately reduce the fingerprint DB according to capabilities of the UE (storage space or calculation ability) or an external environment (space). As an example, when a part of the DB is spatially reduced and then the reduced DB is transmitted to the UE, the DB needs to be updated in order to provide a continuous service (while the UE moves from one space to another).

DISCLOSURE

Technical Problem

The present invention provides a positioning method of a UE in a wireless communication system.

In addition, the present invention provides a method in which a UE calculates the location thereof using a reduced fingerprint DB and updates the reduced fingerprint DB in a wireless communication system.

The technical objects that can be achieved through the present invention are not limited to what has been particularly described hereinabove and other technical objects not described herein will be more clearly understood by persons skilled in the art from the following detailed description.

Technical Solution

According to an embodiment of the present invention, provided herein is a method for calculating a location of a terminal in a wireless communication system, the method being performed by the terminal and comprising transmitting a request for assistance data for calculating the location of the terminal to a location server; receiving the assistance data from the location server; and calculating the location of the terminal using the assistance data, wherein the assistance data includes radio map information including a received signal strength (RSS) value from each access point, collected from multiple reference points within an area of a predetermined range, the radio map information includes information about reference points at which a update of a radio map (hereinafter, "update points") is necessary, and the method further includes determining whether update of the assistance data is needed based on the calculated location of the terminal and the information about the update points.

Preferably, the radio map information may include an identifier of a radio map, a reference location of the radio map, indexes of the multiple reference points arranged in the radio map, and locations of the reference points.

Preferably, the radio map information may include valid time information of the radio map information and valid geographic area information of the radio map information.

Preferably, the determining whether update of the assistance data is needed may include determining whether the calculated location of the terminal corresponds to the update points.

Preferably, the method may further include transmitting an update request of a radio map to the location server upon determining that update of the assistance data is needed, wherein the update request of the radio map includes an identifier of the radio map and indexes of the update points.

Preferably, the update request of the radio map may further include information about a moving direction and moving velocity of the terminal.

Preferably, the RSS value may include a mean of RSS values and a standard deviation of RSS values.

Preferably, the request for the assistance data may include an identifier of a specific radio map when the identifier of the specific radio map is assigned to the terminal.

Preferably, the request for the assistance data may include reference locations of a radio map requested by the terminal and identifiers of the reference locations.

Preferably, the request for the assistance data may include information indicating a geographic range of a radio map requested by the terminal based on an approximate location of the terminal.

Preferably, the request for the assistance data may include information about one or multiple access points accessible by the terminal.

Preferably, the calculating the location of the terminal using the assistance data may include collecting RSS values from one or a plurality of access points at a current location of the terminal, comparing the collected RSS values with the RSS value of the radio map, and determining a reference point having a least difference or most similar pattern between the collected RSS values and the RSS value of the radio map as the location of the UE.

According to another embodiment of the present invention, provided herein is a terminal for calculating a location of the terminal in a wireless communication system, the terminal comprising a radio frequency (RF) unit; and a processor configured to control the RF unit, wherein the processor transmits a request for assistance data for calculating the location of the terminal to a location serve, receives the assistance data from the location server, and calculates the location of the terminal using the assistance data, wherein the assistance data includes radio map information including a received signal strength (RSS) value from each access point, collected from a plurality of reference points within an area of a predetermined range, the radio map information includes information about reference points at which a update of a radio map (hereinafter, "update points") is necessary, and the processor determines whether update of the assistance data is needed based on the calculated location of the terminal and the information about the update points.

The above technical solutions are merely some parts of the embodiments of the present invention and various embodiments into which the technical features of the present invention are incorporated can be derived and understood by persons skilled in the art from the following detailed description of the present invention.

Advantageous Effects

A positioning method according to an embodiment of the present invention can satisfy low positioning latency and satisfy issues of performance and security because private information and a current location of a UE are not provided to a location server. The UE need not unnecessarily use a storage space thereof by using a reduced fingerprint DB and calculation complexity caused by location calculation of the UE for a large DB can be lowered.

In addition, the positioning method according to an embodiment of the present invention can efficiently perform update of a DB in order to provide a continuous service.

The effects that can be achieved through the present invention are not limited to what has been particularly described hereinabove and other advantages of the present invention will be more clearly understood by persons skilled in the art from the following detailed description.

DESCRIPTION OF DRAWINGS

The accompanying drawings, which are included to provide a further understanding of the invention, illustrate embodiments of the invention and together with the description serve to explain the principle of the invention.

BEST MODE

Figure 1:
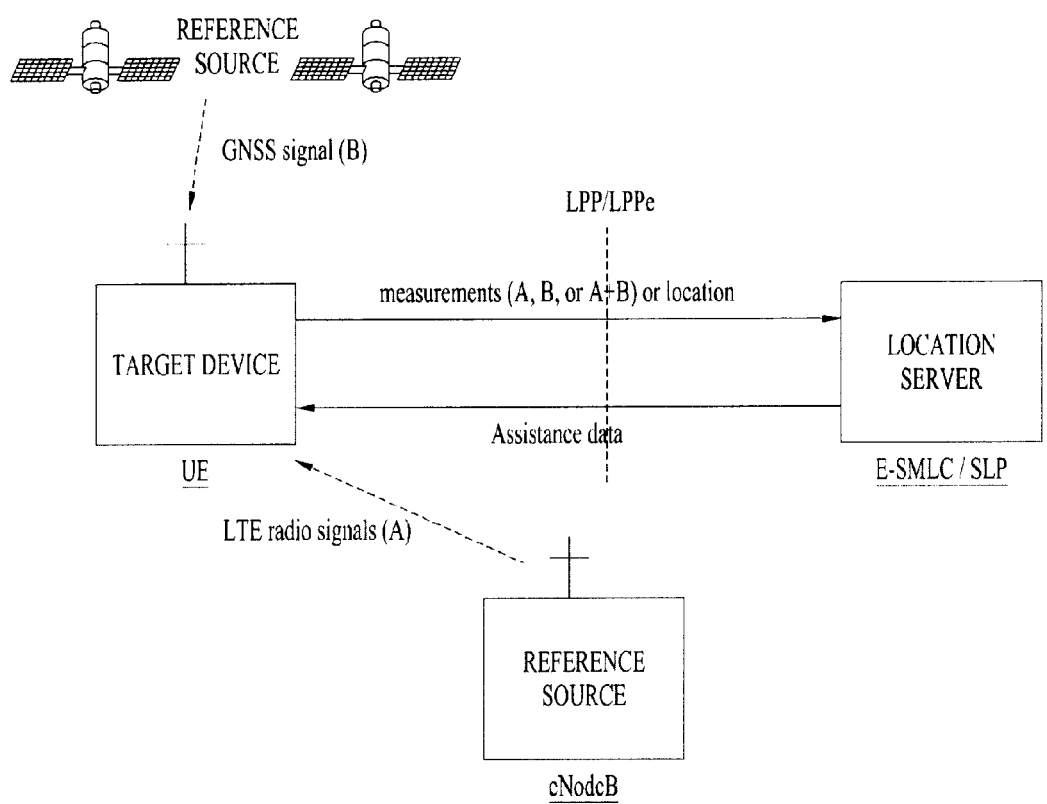
FIG. 1 illustrates the structure for an LTE positioning protocol extension (LPP/LPPe) function.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

In the present invention, a UE may be fixed or mobile and each of various devices that transmit and receive user data and/or various types of information in communication with a server may be the UE. The term UE may be referred to as terminal equipment, mobile station (MS), mobile terminal (MT), user terminal (UT), subscriber station (SS), wireless device, personal digital assistant (PDA), wireless modem, handheld device, etc. In the present invention, a location server refers to a fixed station communicating with a normal UE and/or a server and exchanges data and control information with the UE and/or another server.

Hereinafter, technology associated with the present invention will be described.

Location server: This represents a device for providing assistance data necessary for acquisition of the location of a UE or a third party by connecting to the UE or for calculating the location of the UE by collecting measurement information related to signals from the UE. In the present invention, the location server may be referred to as a server.

Positioning or localization: This is a process to obtain the spatial position of a target.

Reference point: This may be a reference point needed in an equation for calculating the location of any UE or a reference point at which information necessary for positioning is collected.

Radio map reference point: This is a reference point at which an RSS constructing a radio map is measured.

Assistance data or A/D: This represents additional information provided to the UE by the location server when positioning is in progress. For example, the assistance data is information capable of raising positioning performance, such as location information of an access point and frequency information of a signal. Generally, the assistance data is provided to the UE from the location server before positioning is performed.

Location, location information, or L/I: This represents location information of the UE lastly obtained from the UE or the server after positioning is performed.

Access point (AP): This refers to an interface point between a wireless network and a fixed network.

Centroid: This refers to a scheme of obtaining the location of the UE, in which the UE sets a mean value of locations from respective APs as the location of the UE through information of a list of the APs accessible by the UE.

UE (target)-based: This indicates that the UE calculates the location thereof by obtaining values necessary for positioning calculation after exchanging positioning related information (assistance data) with the location server. Generally, the UE (target)-based mode is used only when positioning calculation is not complicated.

UE (target)-assisted: This indicates that the UE transmits values necessary for positioning calculation to the location server after exchanging positioning related information (assistance data) with the location server so that the server calculates the location of the UE. Generally, the UE (target)-assisted mode is used only when positioning calculation is complicated.

Set-initiated (SI): This represents a service type in which positioning acquisition and a positioning execution request are generated by the UE.

Network initiated (NI): This represents a service type in which positioning acquisition and a positioning execution request are generated from a network (exterior or a third party).

Latency: This represents a measure of time delay experienced in a system)

Overview of LTE Positioning Protocol Extension (LPPe)

An LTE positioning protocol (LPP) refers to a message standard on an interface between a UE and a location server, for positioning of the UE defined in 3GPP. As illustrated in FIG. 1, the LPP defines an operation related to transmission of measurements or location measured by the UE to the location server or transmission of assistance data for positioning to the UE from the location server.

Although the LPP is a location protocol defined in 3GPP, the open mobile alliance (OMA) has proposed an LPPe standard item of a message extension type without structural change for a further location service in addition to a location service provided in 3GPP and standardization of the LPPe standard item is under way. The present invention discusses technology discussed in the LPPe 2.0 standard item, standardization of which is in progress, for an indoor positioning service.

Figure 2:
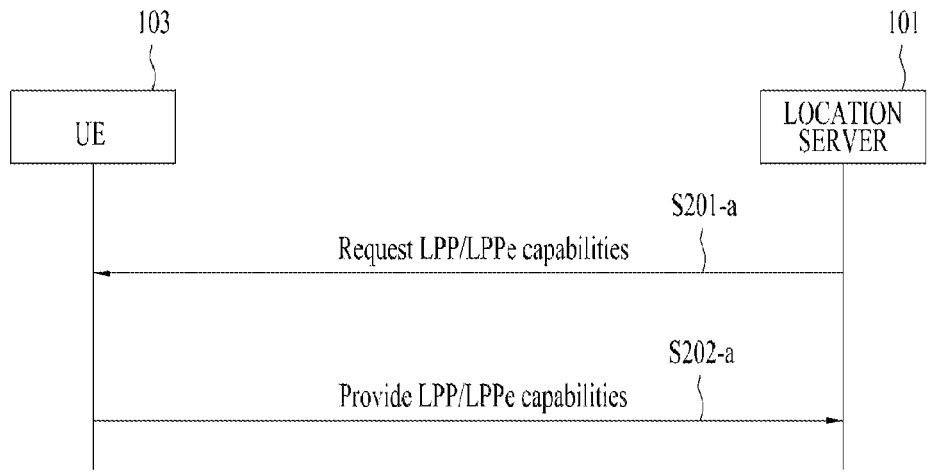
FIGS. 2(a)-2(c) illustrate exemplary LPP/LPPe procedures.
Figure 2:
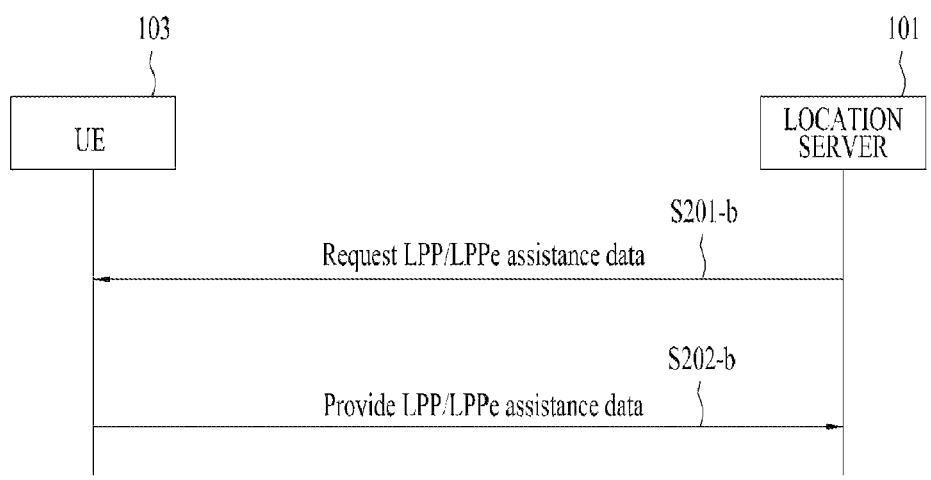
Figure 2:
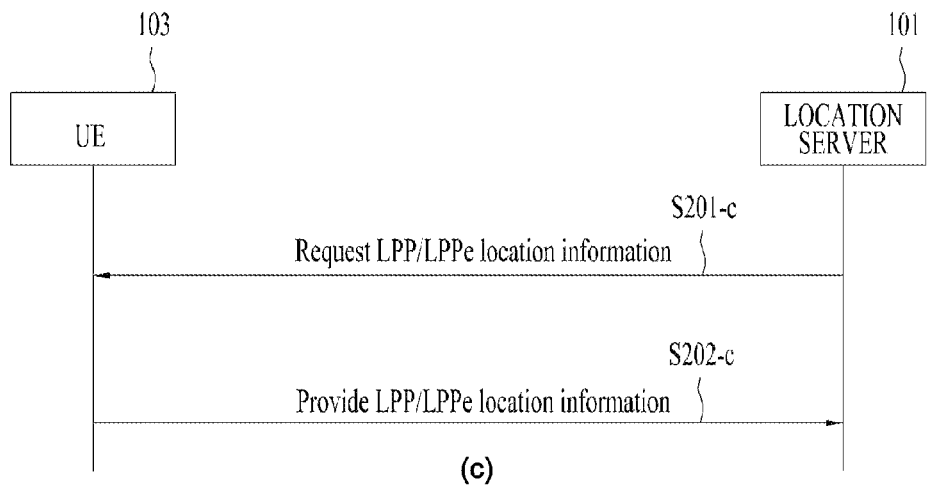

In more detail, an LPP or LPPe procedure includes the following operations which are described with reference to FIGS. 2(a)-2(c).

1) Capability Exchange

For a capability exchange procedure, a location server requests capabilities for performing supportable functions (S201-a) and a UE provides capabilities for performing supportable functions (S202-a). The UE exchanges information, such as a positioning method that can be performed thereby or assistance data that can be applied thereto, with the location server.

2) Assistance Data Exchange

In an assistance data exchange procedure performed after the capability exchange procedure is completed, the location server requests assistance data necessary for calculating or measuring the location of the UE (S201-b) and the UE provides the assistance data (S202-b) according to the request. The assistance data requested by the UE may be represented in various forms according to a positioning scheme that the UE desires to be performed.

3) Location Information Exchange

Location information exchange may be broadly divided into two types.

UE-based location measurement: If the UE that has received the assistance data receives a request for location information from the location server (S201-c), the UE calculates the location thereof and reports the calculated location thereof to the location server (S202-c).

UE-assisted location measurement: If the UE which has received the assistance data receives a request for a measurement value for positioning of the UE from the location server (S201-c), the UE calculates the measurement value and reports the measurement value to the location server (S202-c). Location information of the UE is calculated by the location server based on the measurement value.

Overview of Fingerprint Based Positioning Scheme

A fingerprint positioning scheme will now be described in brief. A fingerprint DB is basically needed for the fingerprint scheme.

To generate the fingerprint DB, a network manager or a manager that provides a positioning service (e.g. a location manager) sets virtual positioning reference points on a predetermined plane and stores RSSs at the reference points, received by a plurality of APs. Only RSSs measured at the respective points may be stored or additional RSSs calculated according to directions at the respective points using directional antennas may be further stored. For example, RSSs according to directions measured at the respective reference points are shown below.

TABLE 1

| Reference Points | Direction | RSS from $AP_1$ | RSS from $AP_2$ | RSS from $AP_3$ |
|---|---|---|---|---|
| RP-1 | 0° | −59 | −75 | −71 |
|  | 90° | −54 | −73 | −67 |
|  | 180° | −49 | −72 | −69 |
|  | 270° | −54 | −73 | −65 |
| RP-2 | 0° | −35 | −64 | −49 |
|  | 90° | −54 | −64 | −42 |
|  | 180° | −49 | −64 | −52 |
|  | 270° | −55 | −64 | −46 |
| RP-3 | 0° | −35 | −66 | −73 |
|  | 90° | −65 | −60 | −68 |
|  | 180° | −63 | −66 | −70 |
|  | 270° | −68 | −62 | −77 |

Figure 3:
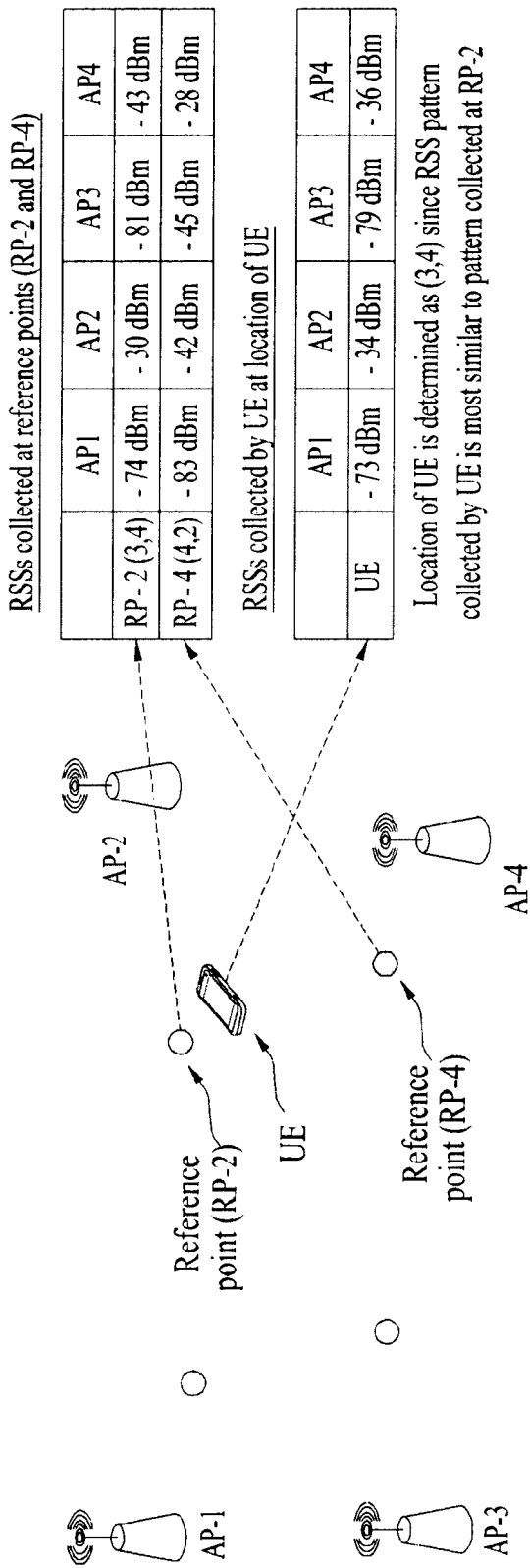
FIG. 3 schematically illustrates a fingerprint based positioning scheme.

FIG. 3 schematically illustrates a fingerprint based positioning scheme. In FIG. 3, a scheme of simply calculating the location of a UE through a fingerprint DB is illustrated. 4 APs and 4 reference points (RPs) are present on a plane of FIG. 3. The UE is present at an arbitrary location. In the upper table of two tables shown in FIG. 3, RSSs (i.e. a radio pattern) measured at RPs RP-2 and RP-4 from 4 APs are recorded. If RSSs received from the 4 APs by the UE at any timing are as shown in the lower table, the UE or a server provides the location of the UE as a value of the stochastically nearest RP or a value around the RP through a mathematical positioning scheme such as maximum likelihood estimation (MLE).

In the example of FIG. 3, since RSSs measured by the UE are similar to a radio pattern of RP-2, the location of the UE may be determined as the value of RP-2 through probabilistic calculation. Alternatively, a scheme of increasing positioning capability may be used by determining the location of the UE as RP-2 through an additional process.

In more detail, the fingerprint based positioning scheme is performed based on the following two phases.

1) offline phase (training or calibration phase)—Method for generating a fingerprint DB Generally, RSSs are obtained at RPs and stored in the form of the fingerprint DB. In this case, important parameters may be summarized as follows.

p: reference position
i: RSS value from the i-th AP
d: direction at each RP (direction in which a UE is located)

Consequently, one fingerprint entity may be a function of (p, d, RSS1, . . . , RSSn).

The above form of the fingerprint DB may include all of the above-described p, i, d, etc., or exclude some parameters according to implementation type. Alternatively, the form of the fingerprint DB may include additional information.

2) Online Phase—Method for Calculating the Location of the UE Using the Fingerprint DB The UE matches the fingerprint DB based on RSSs received from APs at the location thereof and determines a location having the highest matching rate as the location thereof. There are many mathematical matching schemes and a description thereof is omitted in the present invention. The fingerprint based positioning scheme according to an information flow may be divided into two modes according to the role of each device.

1) UE-Assisted Mode

Each UE collects a set of RSSs by receiving and storing beacon signals transmitted from APs (in this case, reception of the beacon signals from various directions is considered). Each UE periodically transmits the collected set of RSSs to a server. The server manages the fingerprint DB and calculates the location of the UE based on an RSS pattern.

2) UE-Based Mode

Each UE forms a set of RSSs by receiving and storing beacon signals transmitted from APs (in this case, reception of the beacon signals from various directions is considered). The UE manages the fingerprint DB and calculates the position thereof based on the set of RSSs.

Problems and requirements of the fingerprint based positioning scheme per mode divided according to the information flow are as follows.

In the UE-assisted mode, generally, complexity is increased in generating the fingerprint DB in the offline phase and data size of the fingerprint DB for raising positioning accuracy is large although the data size differs according to network size and the number of RPs. The location server generates raw data for the fingerprint DB and establishes the fingerprint DB based on the raw data. In addition, the UE which uses the UE-assisted mode in the online phase acquires RSSs from all APs and provides the RSSs to the location server which stores or manages the fingerprint DB. The location server calculates the location of the UE by comparing the RSSs received from the UE with an RSS pattern stored in the fingerprint DB thereof and provides location information of the UE to the UE.

However, in a location based service (LBS) application (e.g. augmented reality or navigation) requiring low positioning latency, it is difficult to acquire real-time positioning information through the UE-assisted mode. Especially, when a network is unstable, it is more difficult to perform positioning through the UE-assisted mode while satisfying the low positioning latency. For example, for an outdoor navigation service, positioning is performed according to the UE-based mode. Since the UE directly calculates the location thereof through received satellite signals, the UE can continuously calculate the location of a moving object without a latency problem even with experiencing unnecessary latency caused by transmission to and reception to and from the network.

The UE-assisted scheme has a high probability of generating problems such as security or invasion of privacy. Generally, various security-related problems occur in a process in which location-related information of the UE is transmitted to a specific server through the network In addition, when problems arise in a calculation process in the locations server, it is difficult for a positioning procedure to proceed.

In order to solve the above-described problems and satisfy the requirements of a specific application, the UE-based mode may be used. However, in the UE-based mode, the size of the fingerprint DB may be problematic. If the size of the fingerprint DB stored in the UE is increased, problems may occur in terms of utilization of a limited storage space. Moreover, as the size of the fingerprint DB is increased, complexity of calculation for determining the location of the UE using a probabilistic method is exponentially increased. Accordingly, in the UE-based mode, it is important to provide a fingerprint DB of a proper size to the UE and update the fingerprint DB.

Figure 4:
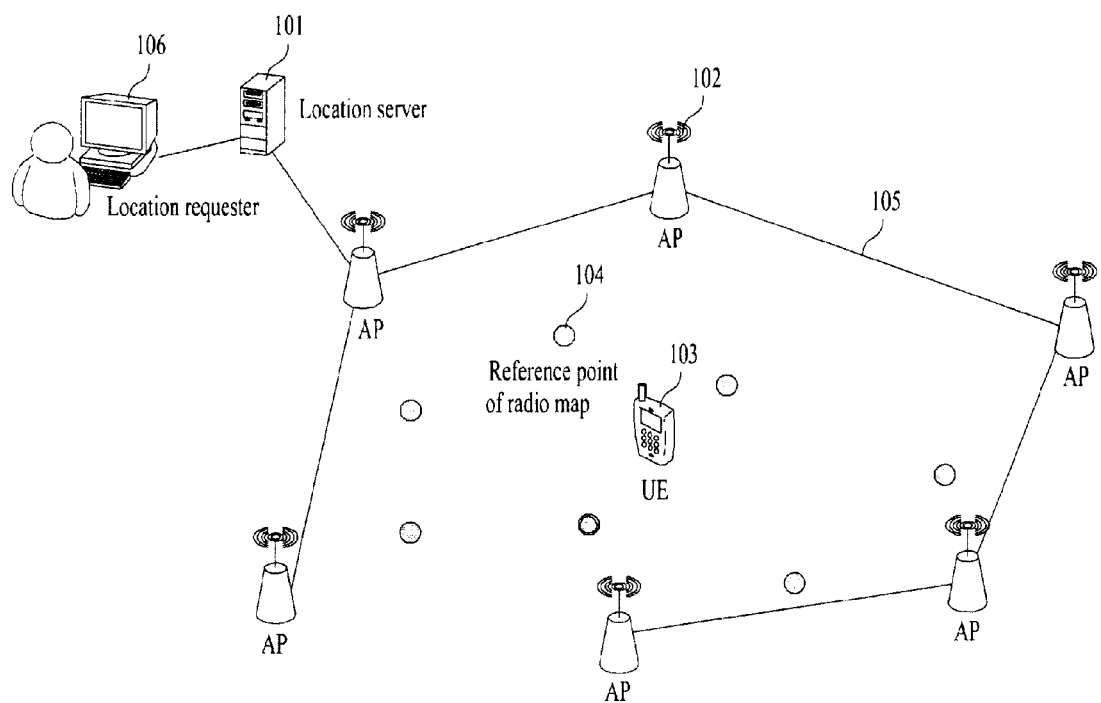
FIG. 4 illustrates a system configuration for wireless location area network (WLAN) based indoor positioning.

FIG. 4 illustrates a system configuration for fingerprint indoor positioning.

In more detail, FIG. 4 illustrates a system and a system configuration for performing a fingerprint positioning scheme. A UE 103 and an AP 102 are connected through a communication interface (WLAN, Bluetooth, etc.). APs are connected to each other through a backhaul network 105 and connected to a location server 101. Additionally, there is an RP 104 as an RP for generating a fingerprint DB.

The RP may be determined in various manners. For example, the RP indicates a point, coordinates of which are predetermined, and a scheme for determining the coordinates may be arbitrarily set through a manager that manages a network.

Figure 5:
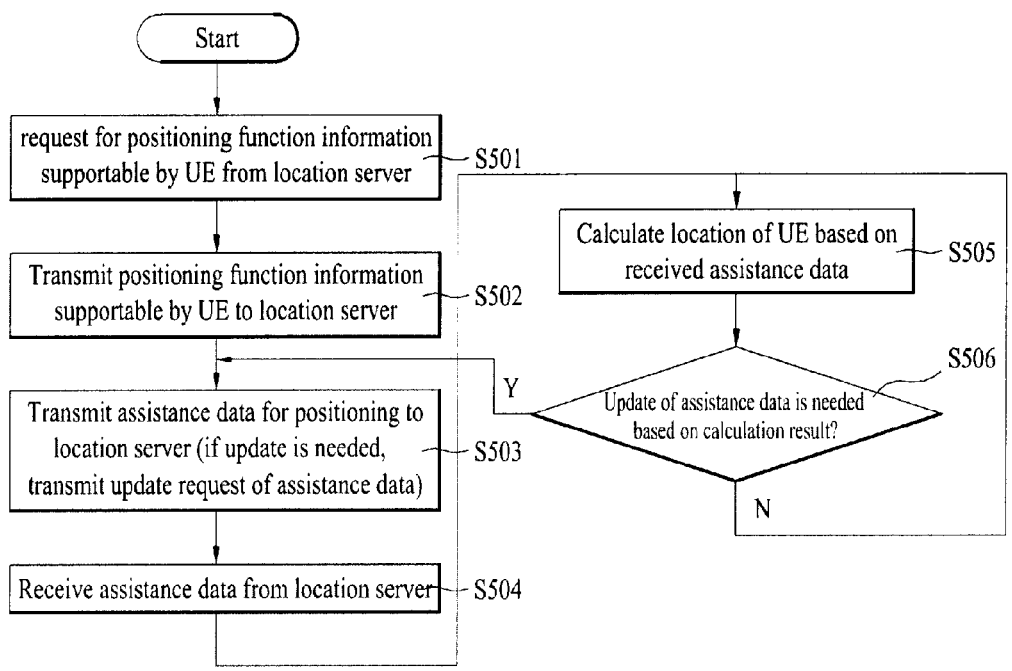
FIG. 5 is a flowchart of a positioning procedure according to an embodiment of the present invention.

FIG. 5 illustrates a positioning procedure according to an embodiment of the present invention. The embodiment of the present invention proposes a UE-based fingerprint positioning method. Although a description of FIG. 5 is given based on the UE, the present invention may also be applied in terms of the location server.

The UE may receive a request for positioning function information supportable thereby from the location server (S501). The request for the positioning function information may be, for example, OMA-LPPe-WLAN-AP-RequestCapability.

Upon receiving the request for the positioning function information, the UE may transmit the positioning function information supportable thereby to the location server (S502). The positioning function information may be, for example, OMA-LPPe-WLAN-AP-ProvideCapability. The positioning function information may be used by the UE to provide capability (capabilities) of the UE for positioning.

Details of OMA-LPPe-WLAN-AP-ProvideCapability are as follows.

```
-- ASN1START
OMA-LPPe-WLAN-AP-ProvideCapabilities ::= SEQUENCE {
    wlan-ecid-MeasSupported BIT STRING {
                                apSSID          (0),
                                apSN            (1),
                                apDevType       (2),
                                apPhyType       (3),
                                apRSSI          (4),
                                apChanFreq      (5),
                                apRTD           (6),
                                ueTP            (7),
                                ueAG            (8),
                                apRepLoc        (9),
                                non-serving     (10),
                                historic        (11) }   (SIZE(1..16)),
    wlan-types-Supported    OMA-LPPe-WLAN-AP-Type-List          OPTIONAL,
```

```
    ap-Capability          OMA-LPPe-WLAN-AP-Capability         OPTIONAL,
    wlan-ap-ADSupported BIT STRING {aplist                (0),
                                    aplocation            (1),
                                    locationreliability   (2),
                                    transmit-power        (3),
                                    antenna-gain          (4),
                                    coveragearea          (5),
                                    non-serving           (6),
                                    radio-map             (7) } (SIZE(1..16)),
    ...
}
OMA-LPPe-WLAN-AP-Capability ::= SEQUENCE {
    apMACAddress       OMA-LPPe-WLAN-AP-ID,
    apTypes            OMA-LPPe-WLAN-AP-Type-List,
    ...
}
-- ASN1STOP
```

A wlan-ecid-MeasSupported field specifies enhanced cell-identifier (E-CID) measurements supported by a target device (i.e. UE) during access to a WLAN AP. This field is represented by a bit string in which a value of 1 at a bit position means that particular measurement is supported and a value of 0 means that specific measurement is not supported. The value of 0 at all bit positions of the bit string means that only a basic WLAN positioning scheme is supported by the target device that reports a WLAN AP ID. The following bits are allocated for indicated measurements.

apSSID: SSID of WLAN
apSN: AP S/N received at target device
apDevType: AP device type
apPhyType: AP PHY type
apRSSI: AP signal strength at target UE
apChanFreq: AP channel/frequency of transmission (TX)/reception (RX)
apRTD: Round trip delay between target device and AP
ueTP: Transmit power of target device
ueAG: Antenna gain of target device
apRepLoc: AP location reported by AP
non-serving: Measurements of non-serving WLAN AP (in addition to serving WLAN AP)
historic: Measurements of WLAN AP A wlan-types-Supported field provides WLAN AP types supported by the target device upon functioning as a WLAN station. This filed is represented by a bit string in which a value of 1 at a bit position means that a particular WLAN type is supported and a value of 0 means that the particular WLAN type is not supported. This field should be provided if supported WLAN AP types are available.

ap-Capability: Presence of this field indicates that the target device may function as a WLAN AP (e.g. a mobile broadband router). This field provides a MAC address and supported WLAN types upon functioning as an AP.

wlan-ap-ADSupported: This field specifies WLAN AP assistance data supported by the target device. This field is represented by a bit string in which a value of 1 at a bit position means that specific assistance data is supported and a value of 0 means that specific assistance data is not supported. The value of 0 at all bit positions of the bit string or absence of this field means that no assistance data is supported. The following bits are allocated for indicated assistance data.

aplist: Mandatory WLAN AP data
aplocation: Location of each WLAN AP
locationreliability: Reliability of WLAN AP location
transmit-power: Signal transmit power of each WLAN AP
antenna-gain: Antenna gain for each WLAN AP
coveragearea: Coverage area for each WLAN AP
non-serving: Information about WLAN APs belonging to an operator other than a serving WLAN AP (or information about a plurality of WLAN AP data sets when the serving WLAN AP is not associated with a PLMN operator or if a target device is not served by a WLAN AP)
radio-map: Radio map information in terms of given area Meanwhile, in this specification, the fingerprint DB refers to the same concept as the radio map. Although OMA-LPPe-WLAN-AP-ProvideCapability has been given as an example of the positioning function information and each field included in OMA-LPPe-WLAN-AP-ProvideCapability has been explained as having a specified name, the positioning function information may be represented by terms other than OMA-LPPe-WLAN-AP-ProvideCapability (or terms of a more general concept) and fields or information elements included in OMA-LPPe-WLAN-AP-ProvideCapability may be represented by other terms (or terms of a more general concept).

Through steps S501 and S502 described above, the location server may acquire the positioning function information supportable by the UE. That is, if assistance data for positioning supportable by the UE is the radio map, an operation performed by the UE, for requesting the assistance data, performing positioning based on the assistance data, and updating the assistance data according to the positioning result, will now be described.

The UE may request that the location server provide the assistance data for positioning (S503). The request for the assistance data may be made for assistance data for UE-based and UE-assisted positioning methods. In more detail, in a WLAN positioning method for example, the assistance data may be an OMA-LPPe-WLAN-AP-RequestAssistanceData or OMA-LPPe-ver2-0-RequestedRadioMap message. Details of the OMA-LPPe-WLAN-AP-RequestAs sis tanceData or OMA-LPPe-ver2-0-RequestedRadioMap message are as follows.

```
ASN1START
OMA-LPPe-WLAN-AP-RequestAssistanceData ::= SEQUENCE {
    requestedAD    BIT STRING {    aplist            (0),
                                   aplocation        (1),
```

-continued

```
                                        locationreliability             (2),
                                        transmit-power                  (3),
                                        antenna-gain                    (4),
                                        coveragearea                    (5),
                                        non-serving                     (6),
    radio-map                       (7) } (SIZE(1..16)),
        requestedAPTypes            OMA-LPPe-WLAN-AP-Type-List,
    -- version 2.0 extension elements
        ver2-0-requestedRadioMap            OMA-LPPe-ver2-0-RequestedRadioMap         OPTIONAL,
                                                                        --Cond radiomapInUse
    ...
}
OMA-LPPe-ver2-0-RequestedRadioMap ::= SEQUENCE {
    units   ENUMERATED {
        cm,
        cm10,
        m,
        m10,
        ...
    } OPTIONAL,
    radioMapReq CHOICE {
        radioMapUniqueIDReq     OCTET STRING,
        radioMapReferencePointsReq              SEQUENCE {
            referencePointUniqueID              OMA-LPPe-ReferencePointUniqueID,
            referencePoints     OMA-LPPe-RelativeLocation,
            ...
        },
        rangeOfRadioMap CHOICE {
            circle      INTEGER (0..127),
            ellipse     SEQUENCE {
                semimajor           INTEGER (0..127),
                semiminor           INTEGER (0..127),
                offsetAngle         INTEGER (0..179)
            },                      --cond UElocationBasis
            ...
        },
        accessableAP            OMA-LPPe-WLAN-AP-Data,
        radioMapUpdateRequest           SEQUENCE {
            radioMapUniqueID            OCTET STRING,
            updatingIndex               INTEGER (1..512),
            highAccuracy3Dvelocty       OMA-LPPe-HighAccuracy3Dvelocity         OPTIONAL,
            ...
        },              --cond radioMapUpdateReq
        ...
    },
    ...
}
-- ASN1STOP
```

A requestedAD field specifies requested WLAN AP assistance data. This field is represented by a bit string in which a value of 1 at a bit position means that specific assistance data is requested and a value of 0 means that the specific assistance data is not requested. The following assistance data types are included in this field. In this specification, the case in which the UE sets a radio-map field to 1 is described.

aplist: Mandatory WLAN AP data
aplocation: Location of each WLAN AP
locationreliability: Reliability of WLAN AP location
transmit-power: Transmit power of each WLAN AP
antenna-gain: Antenna gain for each WLAN AP
coveragearea: Coverage area for each WLAN AP
non-serving: Information about WLAN APs belonging to an operator other than a serving WLAN AP (or information about a plurality of WLAN AP data sets if the serving WLAN AP is not associated with a PLMN operator or if a target device is not served by a WLAN AP)
radio-map: Radio map information in terms of given area A requestedAPTypes field lists WLAN AP types for which assistance data is requested.

radioMapReq: This field indicates that assistance data requested by the target UE (i.e. UE) is a radio map. One of the following parameters may be included in the field.

radioMapUniqueIDReq: A unique ID of radio map data requested in the case in which the UE has a previously acquired ID of a radio map. That is, if an ID of a specific radio map is previously given to the UE by a service provider or a location server, radioMapUniqueIDReq included in the assistance data, radioMapUniqueIDReq corresponds to the ID. Therefore, a corresponding radio map may be requested by including the ID in the assistance data request during first acquisition of the radio map.

radioMapReferencePointsReq: A set of reference locations (represented by relative locations, e.g. orthogonal coordinates) of the radio map and a unique ID for a reference location of the set. This field is present when the UE is aware of a unique ID of a reference location of RPs of the radio map and a set of the RPs of the radio map. Therefore, the UE selects some RPs to acquire a radio map for a specific area. However, discovery of the RPs and IDs of the RPs will not be described in the present invention.

rangeOfRadioMap: When the UE desires to make a request for radio map data for an area corresponding to a circle or an ellipse based on an approximate location of the UE, this parameter specifies information about the circle or the ellipse. If the approximate location of the UE is reported in a common assistance data request parameter, the parameter provides the range of radio map data expressed as a circle having a given radius or as an ellipse type having a given major axis, a given minor axis, and an offset angle (an angle at which the major axis of the ellipse is shifted clockwise from true north by 0 to 179 degrees). The center of the circle or the ellipse is a reported approximate location of the UE. Therefore, when rangeOfRadioMap is transmitted to the location server, the approximate location of the UE is also transmitted.

accessableAP: The UE transmits information about accessible APs to the location server through this field.

LPPe-ver2-0-RequestedRadioMap may be represented by other terms (or terms of a more general concept).

The UE may receive the assistance data from the location server in response to the request for the assistance data (S504). If the assistance data corresponds to a radio map, the server may provide radio map information based on the request. For example, the radio map information may be OMA-LPPe-ver2-0-RadioMap which corresponds to a set of stored RSS patterns for RPs. For example, OMA-LPPe-ver2-0-RadioMap may include the following fields or information.

```
-- ANS1START
OMA-LPPe-ver2-0-RadioMap ::- SEQUENCE {
    radioMapUniqueID                            OMA-LPPe-ver2-0-RadioMapUniqueID OPTIONAL,
    radioMapReferencePoint                      OMA-LPPe-ReferencePoint OPTIONAL,
    validityPeriod                                  OMA-LPPe-ValidityPeriod OPTIONAL,
    validityArea                                    OMA-LPPe-ValidityArea OPTIONAL,
    updateRequiredRadioMapReferencePoint        OMA-LPPe-RleList OPTIONAL,
    firstUpdatePointIndicator                   BOOLEAN,
        radioMap              SEQUENCE (SIZE(1..1024))     OF OMA-LPPe-ver2-0-RadioMapData,
    ...
}
OMA-LPPe-ver2-0-RadioMapData ::= SEQUENCE {
    radioMapReferencePointIndex                 INTEGER (1..1024),
    radioMapReferencePoints                     OMA-LPPe-RelativeLocation,
    rssValueOfAP    SEQUENCE (SIZE(1..128))     OF OMA-LPPe-ver2-0-RSSValueOfAP,
    ...
}
OMA-LPPe-ver2-0-RSSValueOfAP ::= SEQUENCE {
    apData                                          OMA-LPPe-WLAN-AP-Data,
    rssMean                                         INTEGER (-127..0),
    rssStd                                          INTEGER (0..255)   OPTIONAL,
    ...
}
-- ASN1STOP
``` radioMapUpdateRequest: This field provides a unique ID for radio map data defined for an update request and an index of RPs of a radio map indicated by updateRequiredRadioMapReferencePoint when it is predicted that the location of the UE calculated by the UE approximates to RPs indicated by updateRequiredRadioMapReferencePoint in RadioMapData (which will be described later). Optionally, the UE may include a moving direction and velocity information thereof in this field.

Meanwhile, one of the above-described radioMapUniqueIDReq, radioMapReferencePointsReq, rangeOfRadioMap, and radioMapUpdateRequest may be selectively included in the assistance data request or the radio map request. Among the above expressions, "cond" refers to the case in which a subsequently described condition is satisfied, "cond UElocationBasis" specifies only the case of a current location based mode of the UE, and "cond radioMapUpdateReq" specifies only the case in which update of a radio map is requested. Accordingly, radioMapUpdateRequest may be included in the assistance data request/radio map request when update of the radio map is needed.

Meanwhile, although OMA-LPPe-WLAN-AP-RequestAssistanceData or OMA-LPPe-ver2-0-RequestedRadioMap have been given as an example of the assistance data and each field included in OMA-LPPe-WLAN-AP-RequestAssistanceData or OMA-LPPe-ver2-0-RequestedRadioMap has been explained as having a specific name, the request for the assistance data may be represented by terms other than OMA-LPPe-WLAN-AP-RequestAssistanceData or OMA-LPPe-ver2-0-RequestedRadioMap (or terms of a more general concept) and fields or information elements included in OMA-LPPe-WLAN-AP-RequestAssistanceData or OMAradioMapUniqueID: This field refers to an ID of a radio map.

radioMapReferencePoint: This field specifies a reference location for the location of all RPs of a radio map in radioMapReferencePoint. If this field is not present, a default reference locataion is provided by a default RP in LPPe common information.

validityPeriod: This field is used to indicate time information as to when assistance data is valid.

validityArea: This field is used to indicate a geographical area in which radio map data is a valid. If this field is not present, a validity area is apparent from data (e.g. a local map) or the radio map data is global.

updateRequiredRadioMapReferencePoint: When a UE estimates the location thereof as proximity of specific RPs of a given radio map, this field provides a set of the specific RPs (hereinafter, "update points") of the radio map for indicating that the UE should transmit a request for assistance data to update the radio map. Generally, an update point indicates a place to be updated (e.g. stairs connected to another floor, a corridor edge within coverage of the radio map, etc.) among all RPs of the radio map. The update points are represented by run length encoding (RLE). If this field is not present, the radio map cannot be updated and all areas are covered.

As an example, the following table illustrates an XY plane of the radio map and a row m and a column n indicate RPs. In this case, shaded parts and numbers corresponding to the shaded parts indicate the update points. The update points based on RLE may be represented as 1; 1; 8; 1; 1; 1; 4; 2; 4; 2; 2; 2; 1.

TABLE 2

| 1 | 2 | 3 | 4 | 5 | 6 |
|---|---|---|---|---|---|
| 7 | 8 | 9 | 10 | 11 | 12 |
| 13 | 14 | 15 | 16 | 17 | 18 |
| 19 | 20 | 21 | 22 | 23 | 24 |
| 25 | 26 | 27 | 28 | 29 | 30 | firstUpdatePointIndicator: This field is represented by an indicator indicating whether the first point of update points represented in the form of RLE is a point for update (true) or not (false).

radioMap: This field provides a radio map for an area required by the UE. This field may be provided as additional radio map data and the radio map data may be OMA-LPPe-ver2-0-RadioMapData. The radio map is composed of the following information.

radioMapReferencePointIndex: This field indicates an index of an RP of the radio map. The index should be set to be increment by one.

radioMapReferencePoints: This field represents the location of an RP of the radio map which is expressed as a relative location. In addition, this field indicates a location at which RSS values from all accessible APs are measured.

rssValueOfAP: This field represents a mean of RSS values from accessible APs at RPs of the defined radio map of the unit of 1 dBm ranging from −127 to 0. A standard deviation of the RSS values from the accessible APs at RPs of the defined radio map is selectively provided in the unit of 0.1 dBm having the range from 0 to 255. This field includes information of the accessible APs.

Radio map access point data provides an ID of a specific AP from which signals are emitted and additional information for the AP as a part of radio map data. For example, the radio map AP data may be OMA-LPPe-ver2-0-RadioMapAPData. Signals are captured at an RP of a radio map as defined in the radio map data. The radio map AP data may include the following fields.

macAddress: This field defines an indicator capable of uniquely identifying a MAC address or device of an AP.

relative-location: This field provides the location of the AP and optionally provides an estimated location of the AP, relative to an RP for this data set.

Location-reliability: This field provides the reliability R of the AP. The possibility that the AP is not changed is given as a percentage. R may be based on historic change or persistence the location of the AP over a period of time or time interval starting from the time when the location of the AP is lastly provided or the location of the AP is verified by the location server. Location reliability is different from location accuracy and refers to probability of the AP moving to a new location. This field should be provided if requested or available.

Meanwhile, although OMA-LPPe-ver2-0-RadioMap has been given as an example of the assistance data and each field included in OMA-LPPe-ver2-0-RadioMap has been explained as having a specific name, the assistance data may be represented by terms other than OMA-LPPe-ver2-0-RadioMap (or terms of a more general concept) and fields or information elements belonging to OMA-LPPe-ver2-0-RadioMap may be represented by other terms (or terms of a more general concept).

In order to reduce the size of radio map data out of the assistance data, the following scheme is used.

If the UE transmits a current location thereof, radius information, and information of accessible APs to the location server, the location server may reduce a radio map based on the current location (approximate location) of the UE, the radius information, and the information about the APs out of the whole radio map data. The radius information may be basically represented by a circle or an ellipse.

Upon receiving all RPs capable of being provided from the location server through assistance data for positioning (the RPs may be provided to the UE for crowdsourcing), the UE transmits only RPs necessary therefor among all the RPs to the location server and the location server may reduce the radio map using information transmitted from the UE.

Figure 6:
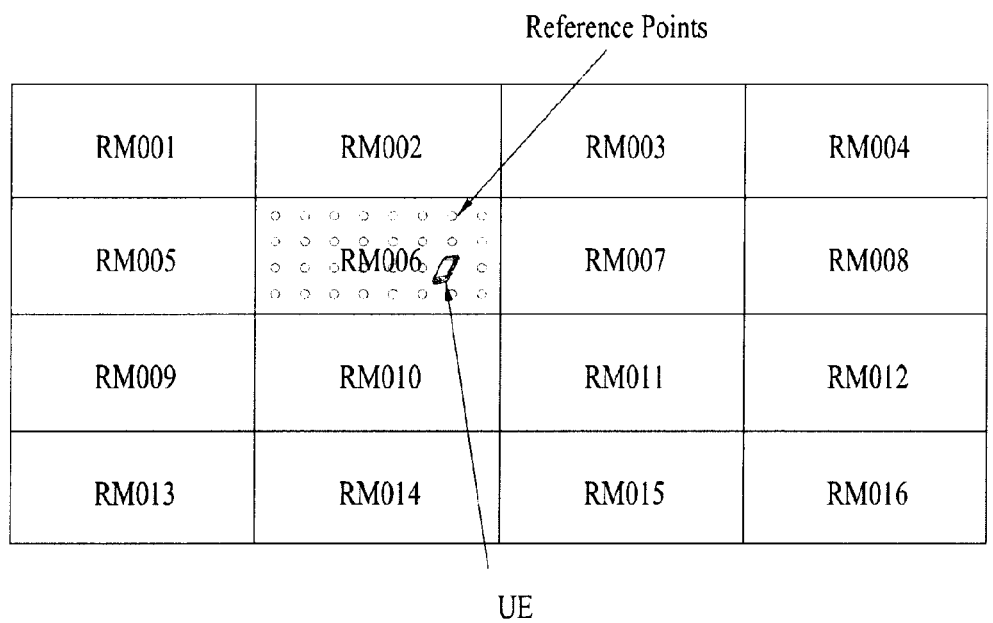
FIG. 6 illustrates an example of a radio map according to an embodiment of the present invention.

—Upon receiving a set of assistance data IDs divided based on a geographic area from a service provider, the UE may receive a radio map of an reduced form indicating a partial area of all areas by directly requesting a corresponding ID. For example, it is assumed that the location server divides a geographic area in which positioning can be performed into multiple sections. FIG. 6 illustrates an example of the geographic area divided into multiple sections. It is assumed that RM001 to RM016 constitute an entire geographic area.

In FIG. 6, each section is assigned an ID and the location server may provide information of each section to the UE prior to a positioning service. The information of each section represents a location value of an edge of the section. As illustrated in FIG. 6, when each section is a rectangle, a corresponding section may be estimated based on location values of the left top and the right bottom. Accordingly, the location server may provide a radio map of a section including an approximate location of the UE (hereinafter, a "partial radio map") or a partial radio map of a section requested by the UE to the UE. In FIG. 6, each of RM001 to RM016 may correspond to one partial radio map. The UE may be aware of an approximate location thereof prior to fingerprint based positioning. For example, after identifying an approximate location of the UE through a scheme (centroid or cell-ID scheme) having lower accuracy than a fingerprint based scheme, the UE determines a section thereof and transmits section information to the location server. In this case, the UE may transmit an ID of a section necessary therefor and receive a partial radio map for the corresponding section.

The UE may request that the location server transmit a necessary radio map based on positioning accuracy required in an application driven thereby. In relation to the requested positioning accuracy, generally, quality of positioning (QoP) is an index indicating accuracy of positioning. In a mobile location service (MLS), a QoP index is indicated when positioning is requested so that the UE may assure positioning accuracy or makes a best effort to assure positioning accuracy. A scheme of denoting positioning accuracy may be as follows.

If positioning accuracy information is transmitted to the location server, the location server may reduce radio map data to be transmitted to the UE through the positioning accuracy information. For example, if positioning accuracy of 10 meters (m) or more is demanded when RPs of a radio map are arranged at an interval of 1 m, the location server may transmit information about RPs of the radio map in the unit of 10 m. Through this scheme, the radio map may be reduced.

Upon receiving the assistance data, the UE may calculate the location thereof based on the assistance data (S505). If the assistance data corresponds to a radio map, especially a partial radio map for a section of a predetermined range, the UE may calculate the location thereof based on the partial radio map.

The partial radio map includes a plurality of RPs arranged in a section of the predetermined range like the above-described fingerprint DB and includes information containing RSSs from APs, measured at the multiple RPs. Therefore, the UE may measure RSSs from APs at a current location thereof and determine an RP having the least difference value as the current location by comparing the measured RSSs with information included in the partial radio map.

The UE may determine whether the assistance data is valid. For example, if the assistance data is radio map information, the UE may determine whether the assistance data, i.e. radio map information, is valid based on a validityPeriod and/or validityArea field included in the radio map information.

Next, the UE may determine whether it is necessary to update the assistance data, i.e. a partial radio map (S506).

If assistance data received from the location server is valid only in a specific geographic section and it is estimated that positioning cannot be performed any more using the assistance data due to movement of the UE, the assistance data needs to be updated. For example, when the assistance data is a partial radio map for a predetermined section, if RPs of the partial radio map are adjacent to another partial radio map or are connected to another partial radio map, it is necessary to request that the partial radio map be updated. Therefore, when the location server provides the assistance data, the UE may also provide information as to whether update is needed.

The information as to whether update is needed corresponds to the above-exemplified update points described in association with "updateRequiredRadioMapReferencePoint". An update request is performed using a "radioMapUpdateRequest" field of "OMA-LPPe-ver2-0-RequestedRadioMap" that is used to make a request for the above-described assistance data. If the location of the UE corresponds to an update point, the UE transmits a unique ID of a radio map for update request and an index of an RP corresponding to the update point to the location server. Optionally, the UE may include a moving direction and velocity information thereof in this field as described above.

Therefore, if it is determined that update is needed, the UE returns to step S503 to make a request for update. If it is determined that update is not needed, the UE may return to step S505 to calculate a current position thereof according to a positioning report period.

According to an embodiment of the present invention, the UE-based positioning method can remarkably reduce the amount of radio map information that the UE should store by using a partial radio map and can efficiently update a radio map which should be necessarily involved in a scheme using the partial radio map based on an update point set by the location server and optionally on the moving direction and moving velocity of the UE.

FIG. 7 illustrates the configuration of a radio map according to an embodiment of the present invention. The radio map is information in which RPs in a predetermined area and RSS values from respective APs, obtained at the RPs are recorded. In a table illustrated in FIG. 7, the extreme left column is radioMapReferencePointIndex indicating all RPs arranged in the radio map. The second column is radioMapReferencePoints indicating a relative location (orthogonal coordinate) of each RP. The third to last columns indicate information in which RSS values from respective APs in the radio map are recorded. Although not shown in FIG. 5, a reference location of the RPs, for example, "radioMapReferencePoint" is predetermined and the radio map or an absolute location of RPs arranged in the radio map can be identified through the reference location of the RPs.

According to another embodiment of the present invention, a UE based image (or picture) recognition based positioning (UE based IRBP) scheme is proposed. The UE based IRBP scheme is basically similar to the aforementioned UE based fingerprint positioning scheme. The fingerprint positioning scheme performs positioning based on a fingerprint DB or an RSS collected at a specific RP of a radio map, whereas the IRBP scheme performs positioning based on an image DB collected at a specific location (shape observed at the specific location, such as scenery, sight, etc.). As an example, the following procedure is performed.

First, it is assumed that various images collected at respective RPs are stored in the location server. A user or UE reduces the image DB similarly to the above-described scheme of requesting and updating the fingerprint DB or the radio map. The UE stores the image DB and performs positioning using the image DB. This embodiment is different from an existing scheme in that since an RP is not present in the image DB, the UE requests the image DB based on a space on a plane for reduction instead of the RP. Image DB update reference is provided to the UE when a space to be updated in a plane is transmitted to the UE through the image DB so that the UE performs positioning according to whether the image DB is present on the space after image recognition positioning. This scheme is performed by a procedure similar to the aforementioned fingerprint based positioning scheme.

Figure 8:
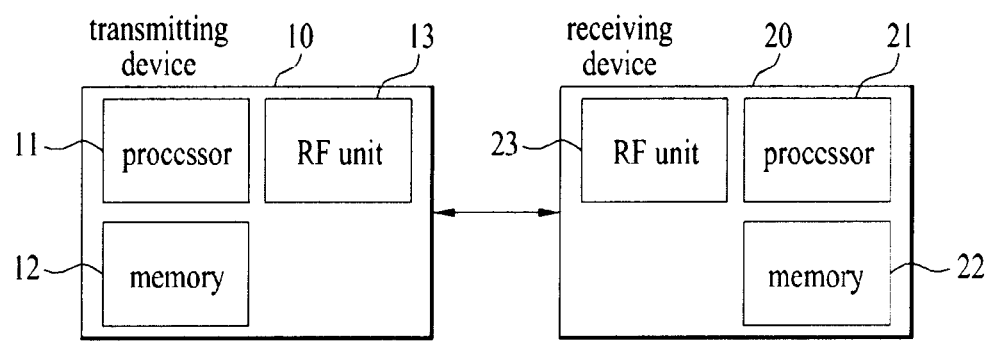
FIG. 8 is a block diagram of a device configured to achieve embodiment(s) of the present invention.

FIG. 8 is a block diagram of a device configured to achieve embodiment(s) of the present invention. A transmitting device 10 and a receiving device 20 respectively include radio frequency (RF) units 13 and 14 for transmitting or receiving information and/or data, signals, messages, etc., memories 12 and 22 for storing various types of information related to communication in a wireless communication system, and processors 11 and 21 connected operatively to components such as the RF units 13 and 23 and the memories 12 and 22, for controlling the components to perform at least one of the above-described embodiments of the present invention.

The memories 12 and 22 may store programs for processing and control of the processors 11 and 21 and temporarily store input/output information. The memories 12 and 22 may be used as buffers.

The processors 11 and 21 generally provide overall control to various modules in the transmitting device 10 or the receiving device 20. Particularly, the processors 11 and 21 may perform various control functions for performing the present invention. The processors 11 and 21 may be called controllers, microcontrollers, microprocessors, microcomputers, etc. The processors 11 and 21 may be achieved by hardware, firmware, software, or a combination thereof. In a hardware configuration, the processors 11 and 21 may include application specific integrated circuits (ASICs), digital signal processors (DSPs), digital signal processing devices (DSPDs), programmable logic devices (PLDs), field programmable gate arrays (FPGAs), etc. that are configured to perform the present invention. In a firmware or software configuration, the firmware or the software may be configured to include a module, a procedure, a function, etc. that performs functions or operations of the present invention. The firmware or software configured to implement the present invention may be included in the processors 11 and 21 or may be stored in the memories 12 and 22 and executed by the processors 11 and 21.

In the embodiments of the present invention, the UE or the location server may operate as devices in which the UE or the location server are installed or mounted, i.e. as the transmitting device 10 or the receiving device 20.

A specific structure of the UE or the location server functioning as the above receiving device or the transmitting device may be realized so as to apply the various embodiments of the present invention described above with reference to the attached drawings independently or to apply two or more embodiments of the present invention at the same time.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to a UE, a server, or other devices of a wireless mobile communication system.

The invention claimed is:

1. A method for calculating a location of a terminal in a wireless communication system, the method being performed by the terminal and comprising:
   transmitting a request for assistance data for calculating the location of the terminal to a location server;
   receiving the assistance data from the location server; and
   calculating the location of the terminal using the assistance data,
   wherein the assistance data includes radio map information including a received signal strength (RSS) value from each of one or more access points, collected from multiple reference points within an area of a predetermined range, and information about update points for which an update of a radio map is necessary, and
   determining whether update of the assistance data is needed based on the calculated location of the terminal and the information about the update points.

2. The method according to claim 1, wherein the radio map information further includes:
   an identifier of a radio map, a reference location of the radio map, indexes of the multiple reference points arranged in the radio map, and locations of the reference points.

3. The method according to claim 1, wherein the radio map information further includes:
   valid time information of the radio map information and valid geographic area information of the radio map information.

4. The method according to claim 1, wherein determining whether an update of the assistance data is needed includes:
   determining whether the calculated location of the terminal corresponds to the update points.

5. The method according to claim 4, further comprising:
   transmitting an update request of a radio map to the location server upon determining that an update of the assistance data is needed,
   wherein the update request of the radio map includes an identifier of the radio map and indexes of the update points.

6. The method according to claim 5, wherein the update request of the radio map further includes information about a moving direction and moving velocity of the terminal.

7. The method according to claim 1, wherein the RSS value includes a mean of RSS values and a standard deviation of RSS values.

8. The method according to claim 1, wherein the request for the assistance data includes:
   an identifier of a specific radio map when the identifier of the specific radio map is assigned to the terminal.

9. The method according to claim 1, wherein the request for the assistance data includes:
   reference locations of a radio map requested by the terminal and identifiers of the reference locations.

10. The method according to claim 1, wherein the request for the assistance data includes:
    information indicating a geographic range of a radio map requested by the terminal based on an approximate location of the terminal.

11. The method according to claim 1, wherein the request for the assistance data includes:
    information about one or multiple access points accessible by the terminal.

12. The method according to claim 1, wherein calculating the location of the terminal using the assistance data includes:
    collecting RSS values from one or a plurality of access points at a current location of the terminal, comparing the collected RSS values with the RSS value of the radio map, and determining a reference point having a least difference or most similar pattern between the collected RSS values and the RSS value of the radio map as the location of the UE.

13. A terminal for calculating a location of the terminal in a wireless communication system, the terminal comprising:
    a radio frequency (RF) unit; and
    a processor in communication with the RF unit,
    wherein the processor controls the RF unit such that the RF unit transmits a request for assistance data for calculating the location of the terminal to a location serve and receives the assistance data from the location server,
    wherein the processor calculates the location of the terminal using the assistance data,
    wherein the assistance data includes radio map information including a received signal strength (RSS) value from each of the one or more access points, collected from a plurality of reference points within an area of a predetermined range, and information about update points for which an update of a radio map is necessary, and
    wherein the processor determines whether an update of the assistance data is needed based on the calculated location of the terminal and the information about the update points.

* * * * *